United States Patent [19]
Jackson et al.

[11] Patent Number: 6,129,299
[45] Date of Patent: Oct. 10, 2000

[54] BULK MATERIAL HANDLING SYSTEM WITH A SLOUGHING WALL

[76] Inventors: Daniel W. Jackson, 2440 SW. 27th St., Redmond, Oreg. 97756; Robertus Philipus Lammers, De Twee Roeden 15, 6931 Westervoort, Netherlands

[21] Appl. No.: 08/878,248

[22] Filed: Jun. 16, 1997

Related U.S. Application Data

[60] Provisional application No. 60/020,449, Jun. 18, 1996.

[51] Int. Cl.[7] .............................. B02C 1/00; B02C 23/02
[52] U.S. Cl. ...................... 241/185.5; 241/263; 241/283; 241/605
[58] Field of Search ................... 241/185.5, 262, 241/263, 273.1, 283, 605, 186.35

[56] References Cited

U.S. PATENT DOCUMENTS

| | | | |
|---|---|---|---|
| 3,709,441 | 1/1973 | Hessner et al. | 241/94 |
| 4,037,740 | 7/1977 | Wood et al. | 241/283 X |
| 4,248,565 | 2/1981 | Wamsley | 241/283 X |
| 4,428,537 | 1/1984 | Von Der Heide | 241/283 X |
| 5,025,992 | 6/1991 | Niebur | 241/101.7 |
| 5,197,684 | 3/1993 | Bihlet et al. | 241/283 |
| 5,222,675 | 6/1993 | Stover | 241/101.1 |
| 5,340,042 | 8/1994 | Bergkamp et al. | 241/283 |
| 5,590,839 | 1/1997 | Condrey | 241/27 |

*Primary Examiner*—John M. Husar
*Attorney, Agent, or Firm*—Delbert J. Barnard

[57] ABSTRACT

A reciprocating slat conveyor (22) conveys a body of bulk material (16) to the outlet end (21) of a container (12). The body of bulk material (16) is moved against a sloughing wall (10). The sloughing wall (10) includes a plurality of slats (40) that are mounted for generally up and down reciprocation. The slats (40) carry bulk material engaging teeth (60, 62). In response to the generally up and down movement of the slats (40) the teeth (60, 62) break loose the bulk material (16). The loosened bulk material falls down onto a secondary conveyor (14) which leads it away from the container (12).

16 Claims, 9 Drawing Sheets

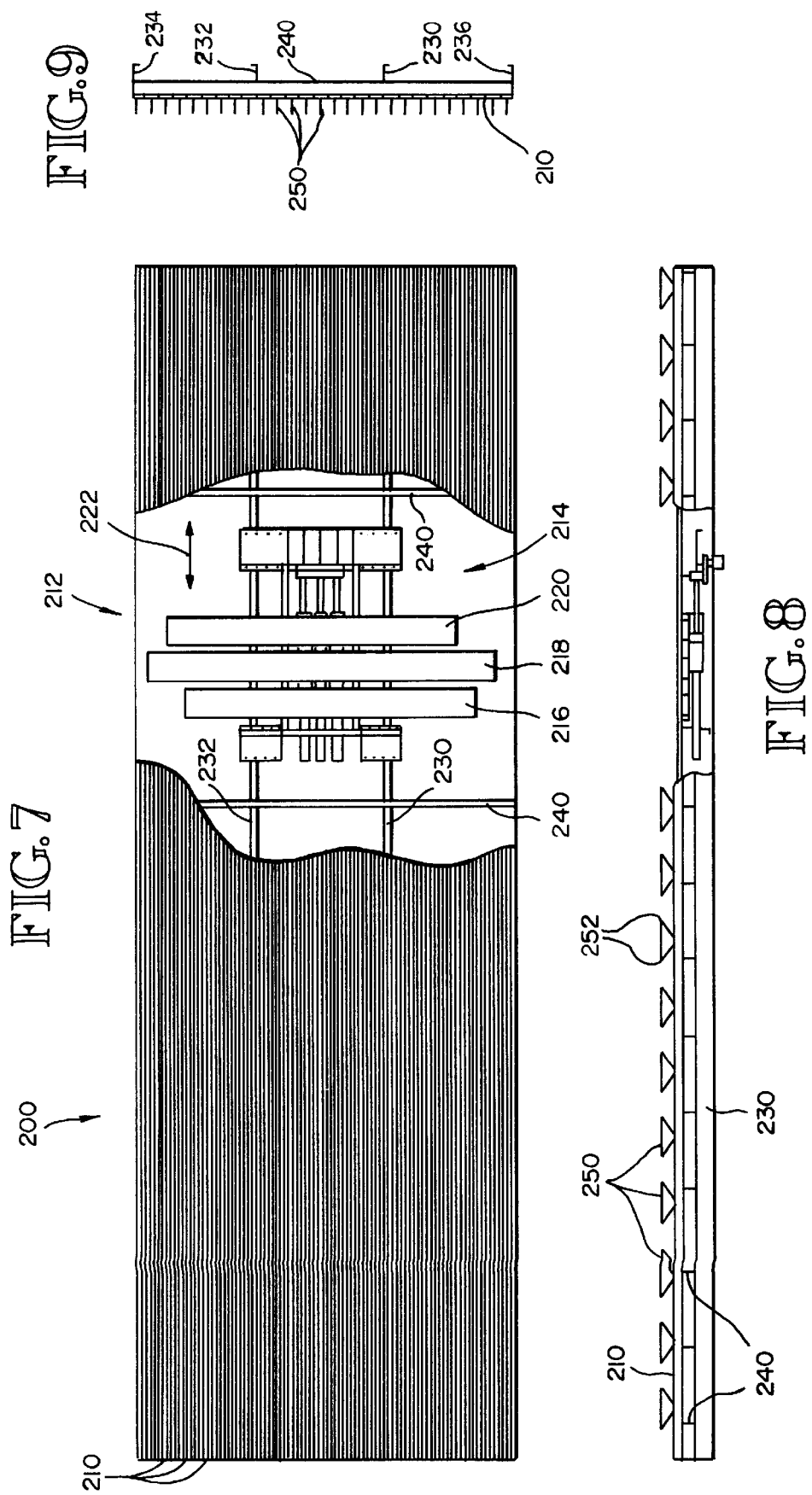

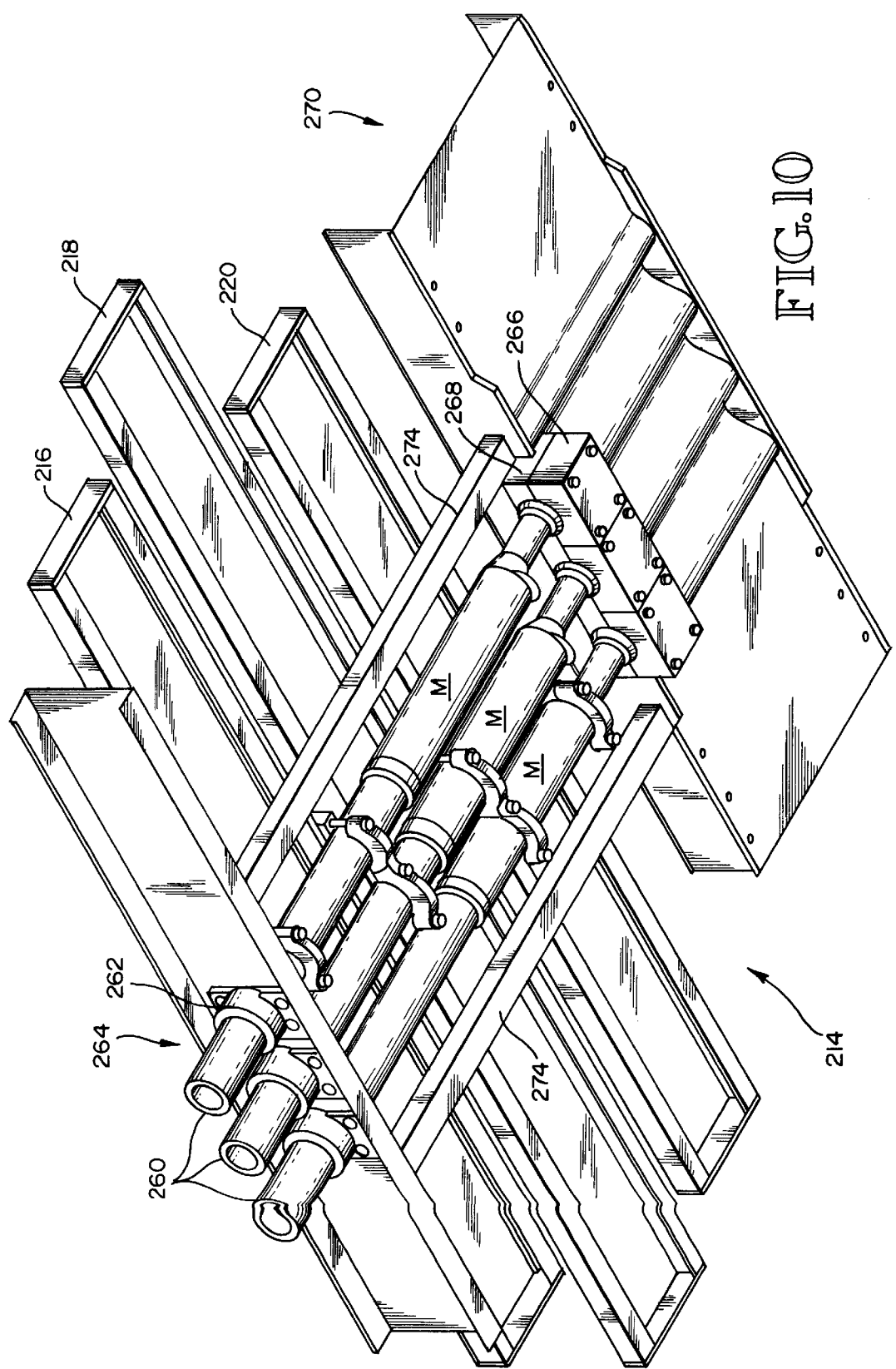

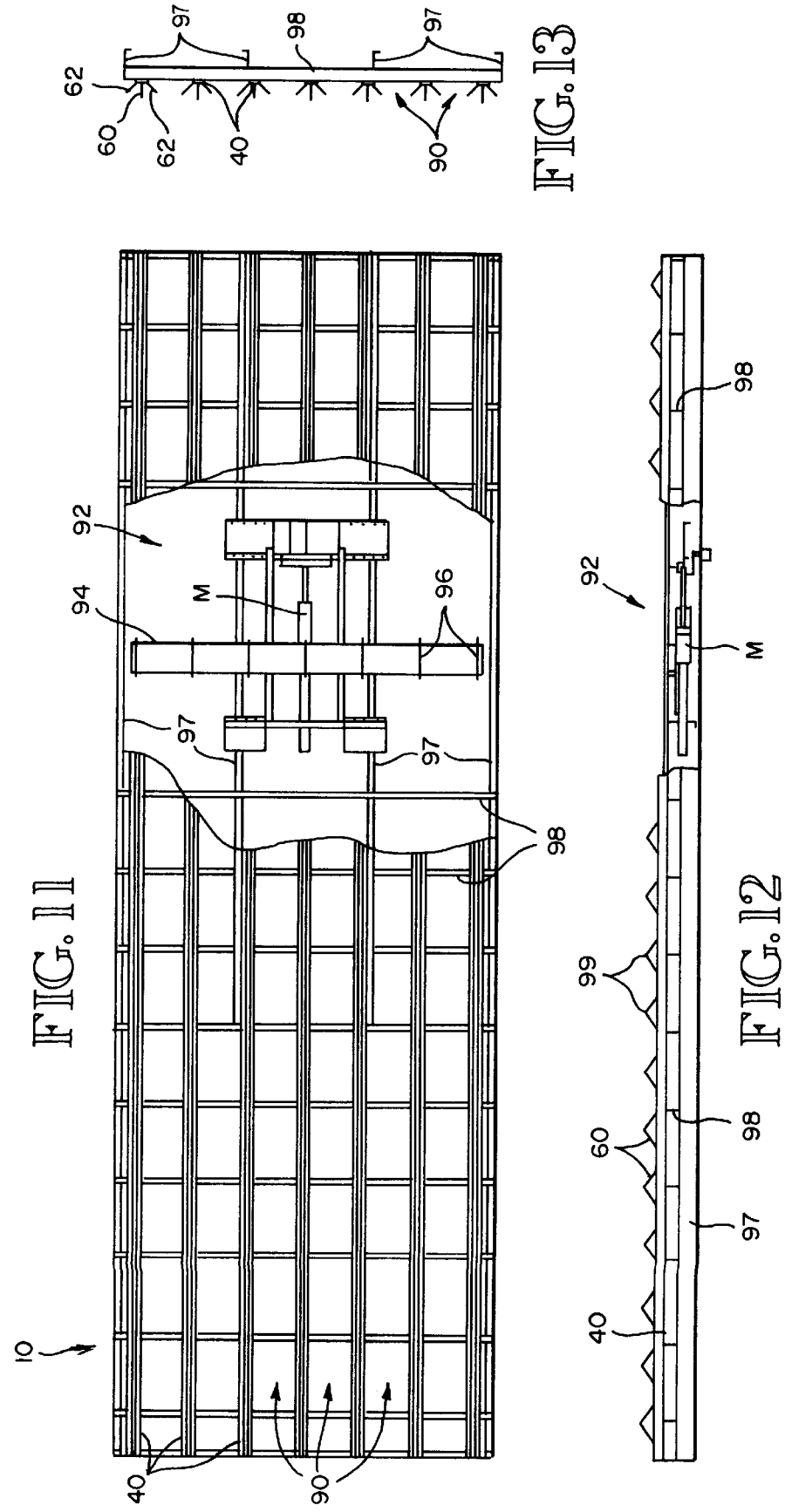

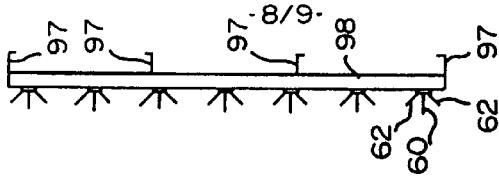
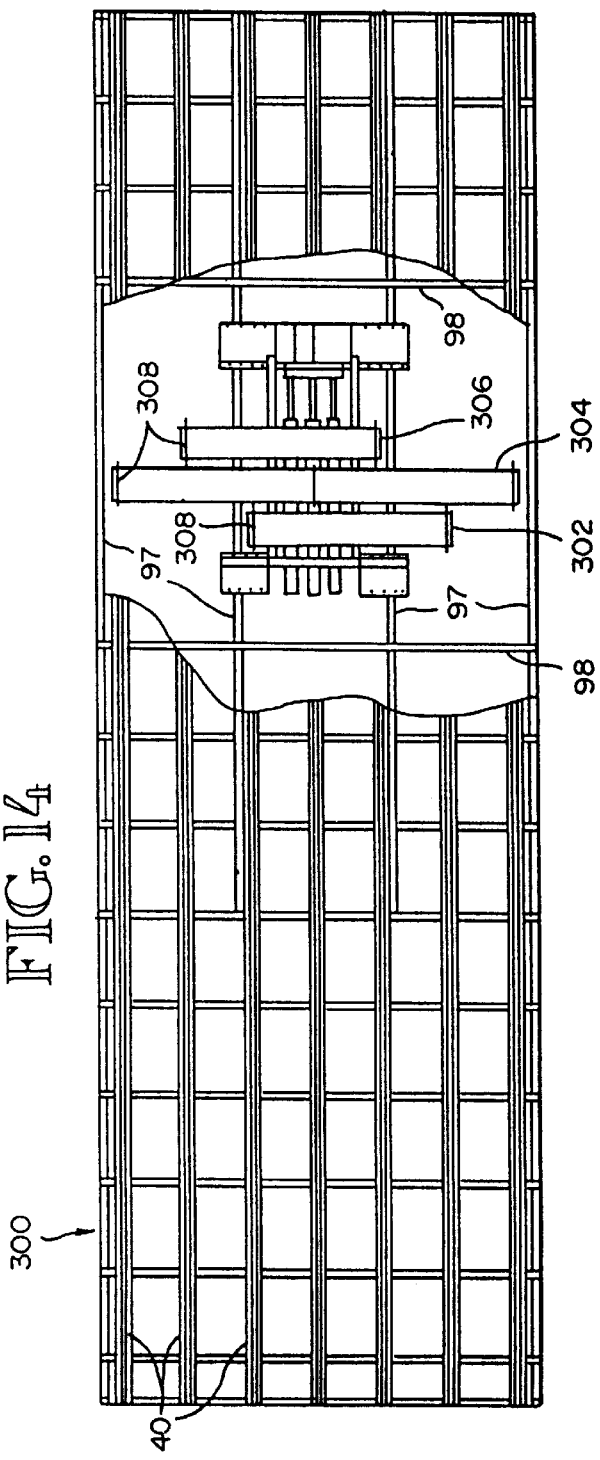
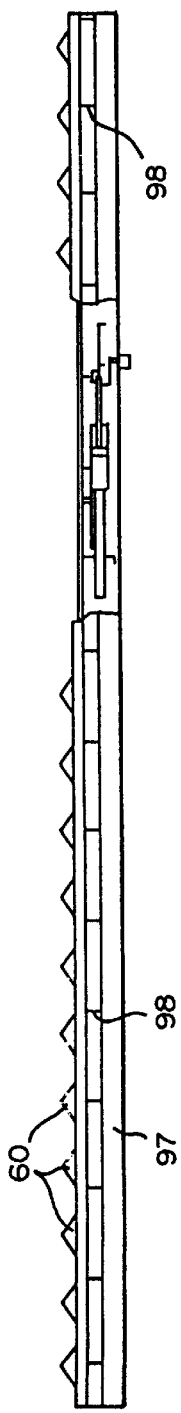

BULK MATERIAL HANDLING SYSTEM WITH A SLOUGHING WALL

CROSS REFERENCE TO RELATED APPLICATION

This application claims the benefit of Provisional Application Ser. No. 60/020,449, filed Jun. 18, 1996 and entitled "Sloughing Wall."

TECHNICAL FIELD

The present invention relates to a bulk material handling system. More particularly, it relates to a conveyor for moving bulk material out from a container and a sloughing wall at the outlet of the container for breaking apart a forward portion of the bulk material as the bulk material is being conveyed outwardly from the container.

BACKGROUND OF THE INVENTION

Patent Application Ser. No. 08/560,799, entitled, "Bulk Material Handling System," and filed Nov. 21, 1995, now U.S. Pat. No. 5,716,012 by Raymond Keith Foster, discloses a bulk material handling system that includes a collector bin for receiving bulk material and a bulk material break-up device positioned at an outlet end of the collector bin. The disclosure in this co-pending application is expressly incorporated herein by reference. In some aspects, the present invention is an improvement over the system disclosed in this application.

In some bulk material handling systems, bulk material is collected in a collector bin and subsequently transferred to a second conveyor. A typical arrangement is where the first collector bin is relatively large and is used to collect bulk material, while the second conveyor is relatively small and is only used to transfer bulk material. With this arrangement, it may be necessary to meter the bulk material from the collector bin onto the second conveyor. Also, when the second conveyor is aligned at an angle to the collector bin, it may be necessary to meter the bulk material as the bulk material is transferred from the collector bin to the second conveyor. A good example of such a bulk material handling operation can be found in agricultural by-product processing systems, such as would be used for handling corn bran by-product in corn processing facilities.

In addition, some types of bulk material tend to clump and, to a certain extent, bind together when the material sits for a while and compacts under its own weight. Clumped bulk material may need to be broken apart prior to transferring it to a secondary conveyor.

Application Ser. No. 08/560,799 now U.S. Pat. No. 5,716,012 discloses various types of break up/metering devices that are particularly suited for garbage handling. The present invention like the one disclosed in co-pending application Ser. No. 08/560,799, is suitable for garbage as well as agricultural products, such as corn bran, and other similar types of bulk material.

DISCLOSURE OF THE INVENTION

The bulk material handling system of the present invention is basically characterized by a container for receiving bulk material that includes a floor, a pair of sidewalls, and an outlet end. The floor comprises a conveyor for conveying bulk material through the container and out the outlet end. The conveyor has a discharge end that is generally at said outlet end. A material break-up device is positioned at the outlet end of the container and substantially at the discharge end of the conveyor. The material break-up device is operable for loosening bulk material as the bulk material is being moved by the conveyor out of the container. The break-up device comprises a generally vertical frame, in the path of bulk material, a plurality of elements mounted on said frame for generally up and down reciprocation, and bulk material contacting teeth on said elements. In preferred form, the elements are elongated and parallel, and the bulk material contacting teeth are distributed along said elements. The bulk material break-up device may include spaces between the elements through which bulk material may pass.

According to an aspect of the invention, the frame is pivotally mounted on said container for pivotal movement about a horizontal axis. Preferably, the axis is at least near the upper end of the frame.

In preferred form, the elements are elongated slat members which include mounting members for the teeth. The teeth are detachably secured to the mounting members.

According to an aspect of the invention, a secondary conveyor is positioned below the outlet end of the conveyor. Bulk material loosened by the bulk material break-up device falls into the secondary conveyor through a space that is between the outlet end of the container and the break-up device.

These and other features will become apparent from the following detailed description of the best mode for carrying out the invention with reference to the drawings. The claims appended hereto are a part of the disclosure of the invention.

BRIEF DESCRIPTION OF THE DRAWINGS

In the drawings, like reference numerals refer to like parts throughout the several views, wherein:

FIG. 7 is a plan view of a third embodiment of the sloughing wall of the present invention, shown with a portion of its slats cut away to illustrate the drive unit for moving the slats of the sloughing wall;

FIG. 8 is a side elevation view of the sloughing wall of FIG. 7, also shown with a portion cut away to illustrate the drive unit;

FIG. 9 is an end elevation view of the sloughing wall of FIG. 7;

FIG. 10 is a pictorial view of the drive unit for the sloughing wall of FIG. 7;

FIG. 11 is a plan view of another embodiment of the sloughing wall of the present invention, shown with a portion cut away to illustrate the drive unit;

FIG. 12 is a side elevation view of the sloughing wall of FIG. 11, also shown with a portion cut away to illustrate the drive unit;

FIG. 13 is an end elevation view of the sloughing wall of FIG. 11;

FIG. 14 is a plan view of another embodiment of the sloughing wall of the present invention, shown with a portion cut away to illustrate the drive unit therefore;

FIG. 15 is a side elevation view of the sloughing wall of FIG. 14, shown with a portion cut away to illustrate the drive unit;

FIG. 16 is an end elevation view of the sloughing wall of FIG. 14;

DESCRIPTION OF THE INVENTION

Figure 1:
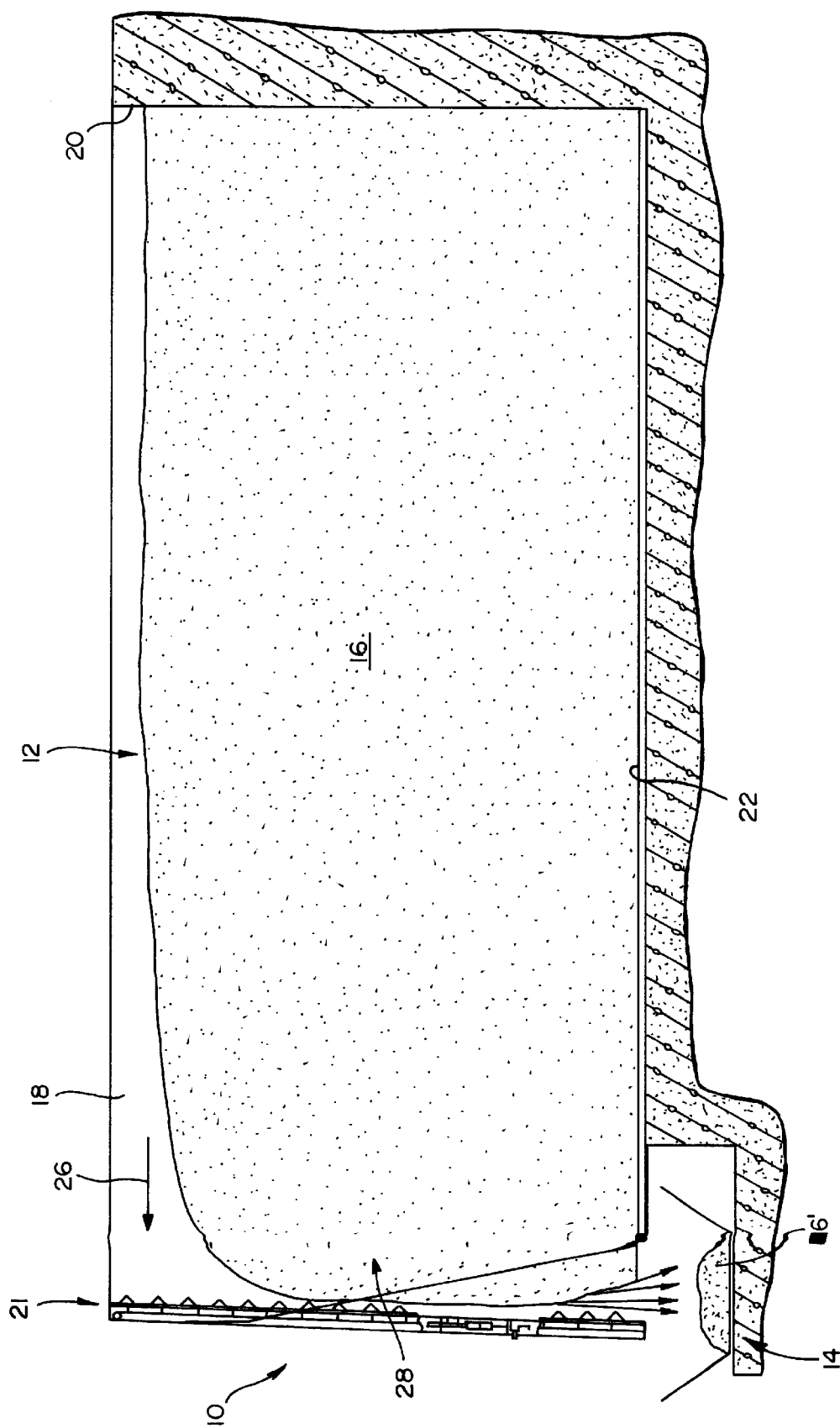
FIG. 1 is a schematic side elevation view of the sloughing wall of the present invention shown in combination with a collector bin and secondary conveyor.

FIG. 1 illustrates a first embodiment of a sloughing wall 10 of the present invention. Sloughing wall 10 is designed to operate in conjunction with a collector bin or bunker 12 and a secondary conveyor 14. Collector bin 12 is shown with a side wall cut away to illustrate a loaf or supply of bulk material 16 within the collector bin. Collector bin 12 includes a first side wall 18, a back wall 20, the other side wall (not shown), and an outlet end 21.

A conventional reciprocating floor conveyor 22 forms the floor of collector bin 12. Reciprocating floor conveyor 22 may be of the type disclosed in U.S. Pat. No. 4,712,467, granted Dec. 15, 1987, in U.S. Pat. No. 4,748,893, and U.S. Pat. No. 4,748,894, both granted Jun. 7, 1988, and in U.S. Pat. No. 4,821,868, granted Apr. 18, 1989, all to Raymond Keith Foster. While a collector bin or bunker having a reciprocating floor conveyor as its floor is illustrated for use with sloughing wall 10, the sloughing wall can be utilized with any type of bulk material conveying apparatus known in the art. All that is necessary for use of the present invention is an apparatus for moving or conveying bulk material out an outlet end of the apparatus.

Secondary conveyor 14 is shown aligned at a right angle to reciprocating floor conveyor 22. In this arrangement, bulk material 16 is conveyed by reciprocating floor conveyor 22 in the direction of arrow 26 and is deposited onto secondary conveyor 14, as shown by bulk material 16'. Secondary conveyor 14 then conveys bulk material 16' in a direction into or out of the page.

For the present invention, the relationship between secondary conveyor 14 and reciprocating floor conveyor 22 does not have to be that of a right angle. Secondary conveyor 14 can be positioned at any angle with respect to reciprocating floor conveyor 22, and could in fact be positioned in alignment with reciprocating floor conveyor 22. The basic idea of the present invention is to meter a large supply of bulk material from a first conveyor onto a secondary conveyor so that the bulk material can be transported by the secondary conveyor in a controlled manner. The sloughing wall acts as a metering device to break apart or comb the forward portions 28 of bulk material 16 so that bulk material 16 can be transferred to secondary conveyor 14 in a controlled fashion.

Bulk material 16 can be of any type of bulk material that is commonly collected, transferred and/or processed. Examples of such types of bulk material are agricultural by-products, such as corn bran, scrap materials and types of garbage, cotton, hay, twigs and other similar types of materials.

Figure 2:
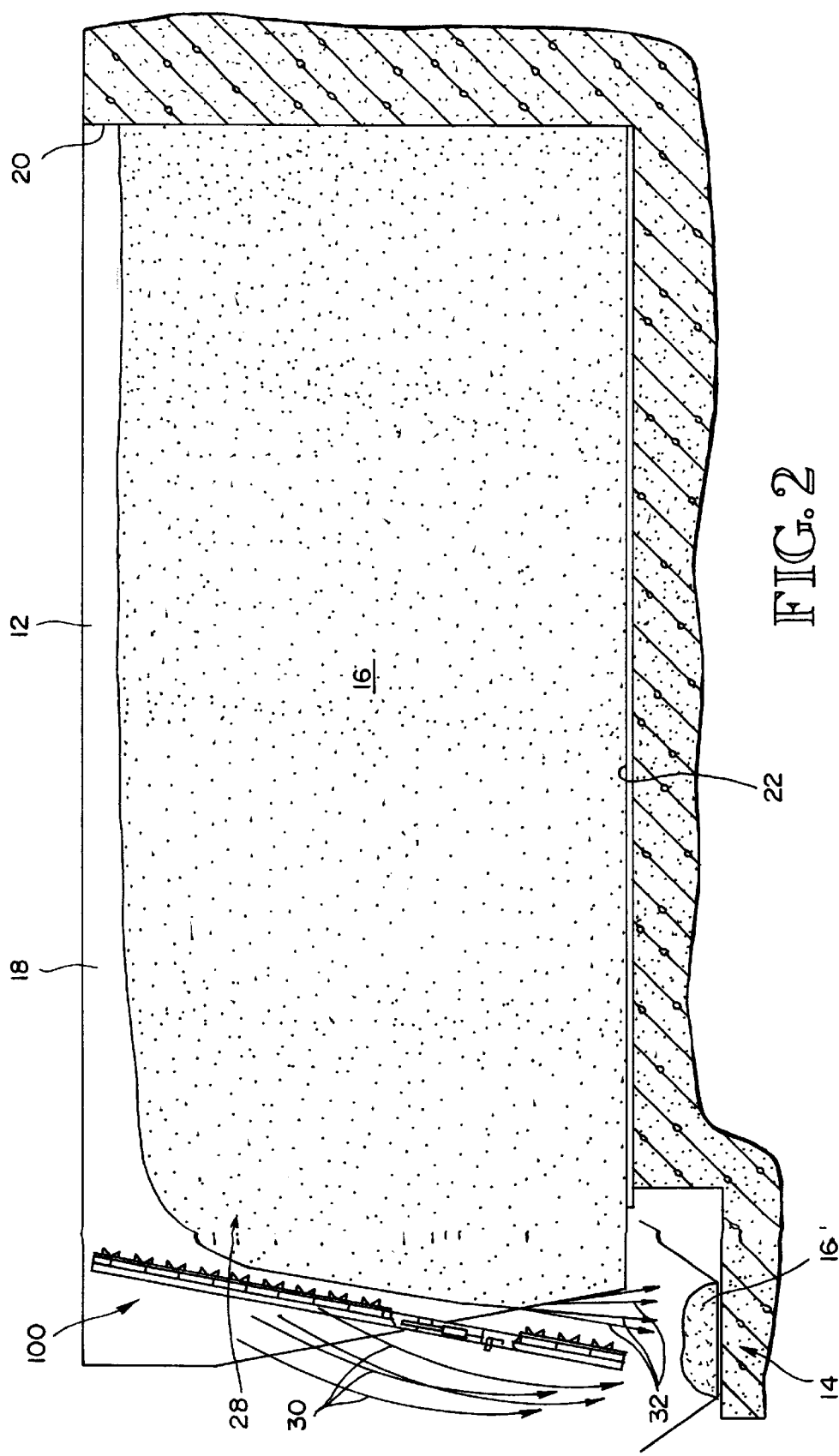
FIG. 2 is a schematic side elevation view of a second embodiment of the sloughing wall of the present invention, shown in combination with a collector bin and secondary conveyor.

Referring to FIG. 2, a second embodiment of a sloughing wall 100 is shown. The difference between sloughing wall 100 and sloughing wall 10 of FIG. 1 resides in the teeth that each sloughing wall utilizes to grab the forward portions 28 of bulk material 16. These differences are discussed later. Sloughing wall 100 (as well as any of the sloughing wall embodiments discussed herein) preferably is mounted at an angle from vertical toward bulk material 16. Sloughing wall 100 can be pivotally mounted at a point anywhere along its length so that its angle of forward inclination can be selectively adjusted for different types of bulk material. Such a selectively pivotal mounting design should be apparent to one of skill in the art.

Another difference between sloughing wall 100 of FIG. 2 and sloughing wall 10 of FIG. 1 is that sloughing wall 100 is designed to have gaps in it, which gaps run the length of sloughing wall 100. These gaps, which are discussed in more detail later, allow some of the bulk material to pass through sloughing wall 100, as indicated by arrow lines 30. Arrow lines 32 indicate the movement of some of the bulk material downwardly in front of sloughing wall 100 onto secondary conveyor 14. Gaps would be preferable for handling agricultural by-products, while a sloughing wall without gaps would be preferable for handling garbage.

Several embodiments of the sloughing wall of the present invention are discussed herein. Each embodiment is in the form of an upright reciprocating slat conveyor similar in many respects to the reciprocating floor conveyor in the collector bin. Each sloughing wall includes a plurality of slats mounted for reciprocating movement up and down along a frame structure. Guide beams and bearings are provided to control movement of the slats. A hydraulic drive unit is provided for moving the slats. The drive unit is discussed in more detail later.

Figure 3:
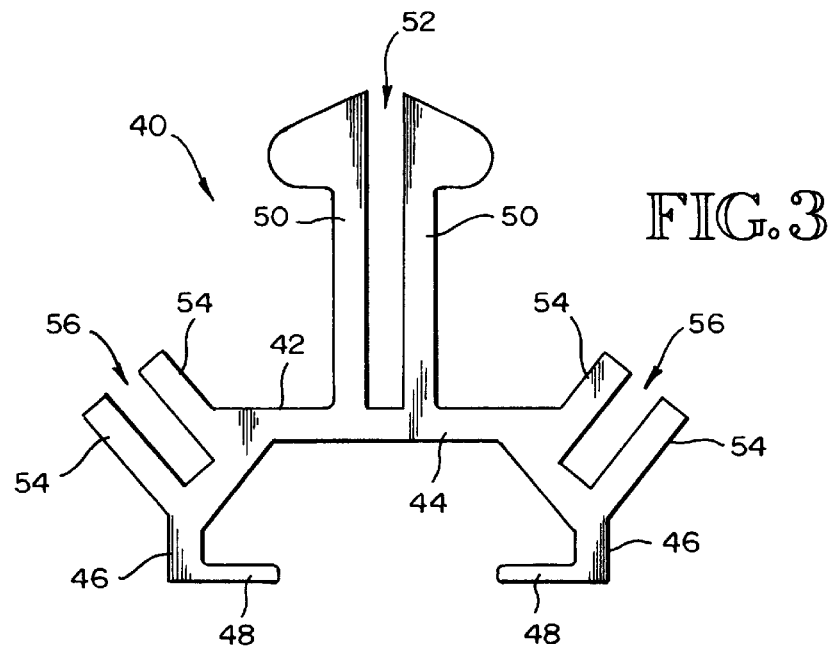
FIG. 3 is an end elevation view of a conveyor slat of the sloughing wall of FIGS. 1 and 2.

Referring to FIG. 3, shown is an end elevation view of a slat 40 for use in a sloughing wall with gaps, as discussed with reference to FIG. 2. Conveyor slat 40 includes a substantially U-shaped portion 42, including a top portion 44 and a pair of downwardly depending legs 46. Each downwardly depending leg 46 has an inwardly projecting flange 48. Flanges 48 operate in conjunction with bearings (not shown) to hold down and guide the slats in a reciprocating manner. The earlier mentioned prior patents discuss in more detail the design of the bearings.

Extending upwardly from top portion 44 are a pair of teeth mounts 50 that form between them a slot 52. Teeth mounts 50 extend the length of slat 40. At the upper side corners of U-shaped portion 42 are formed pairs of auxiliary teeth mounts 54 that form between them slots 56. Slots 56, like slot 52, extend the lengthy of slat 40.

Figure 4:
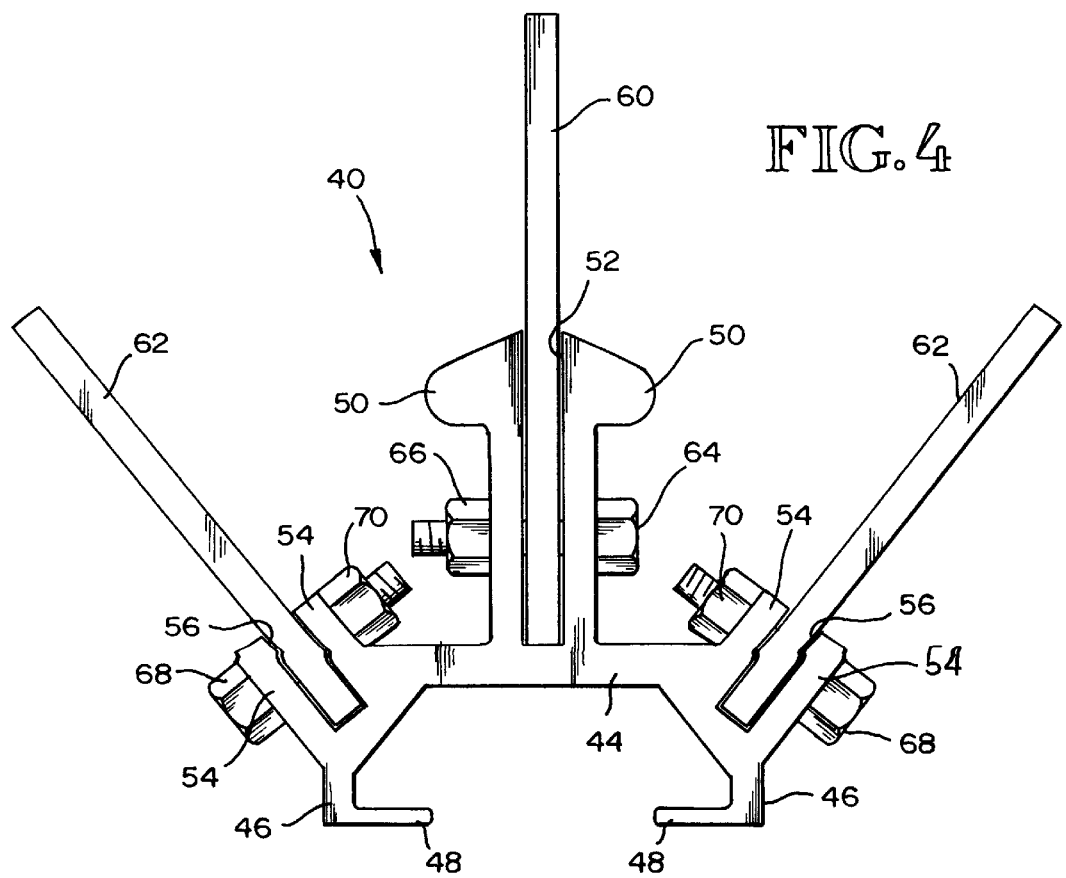
FIG. 4 is an end elevation view of the conveyor slat of FIG. 3 shown with three bulk material engaging teeth secured thereto.

Referring to FIG. 4, a set of bulk material engaging teeth 60, 62 are shown mounted on slat 40. Center tooth 60 is mounted within slot 52 and between teeth mounts 50 by means of a bolt 64 and nut 66. Tooth 60 has an opening therein for receiving bolt 64. Each slot 52 receives a plurality of spaced teeth 60 along its length, each secured within slot 52 by means of a bolt and nut. Auxiliary teeth 62 are secured within slots 56 and between teeth mounts 54 by means of bolts 68 and nuts 70. Auxiliary teeth 62, like center teeth 60, include openings for receiving bolts 68. A plurality of spaced auxiliary teeth 62 are provided along the length of both slots 56 so that an array of auxiliary teeth 62 and center teeth 60 are provided along the entire length of slat 40.

Figure 5:
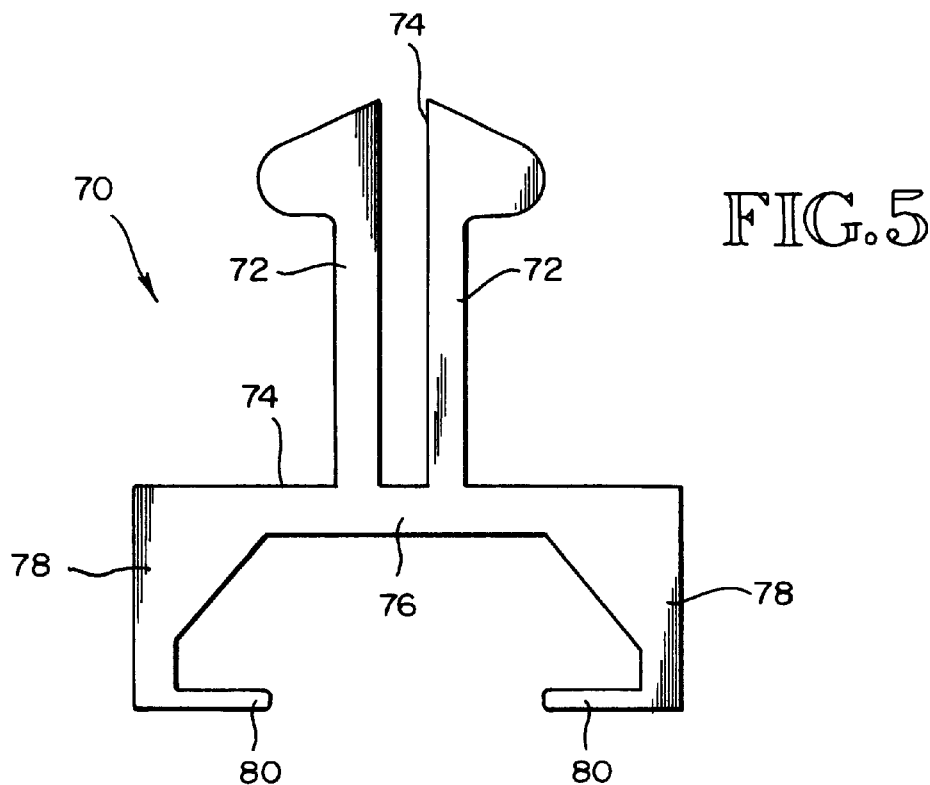
FIG. 5 is an end elevation view of a conveyor slat of the sloughing wall of FIG. 7.

Referring to FIG. 5, a slat 70 of a third embodiment of the sloughing wall of the present invention is shown. A substantially U-shaped portion 74 includes a top portion 76, and a pair of downwardly depending legs 78, each of which includes an inwardly directed flange 80. Slat 70, like slat 40, includes a pair of teeth mounts 72 that form a slot 74 therebetween. A tooth, similar to tooth 60 of FIG. 4, is mounted in slot 74. Slat 70 does not include auxiliary teeth mounts because it is designed for use in a sloughing wall without gaps.

Figure 6:
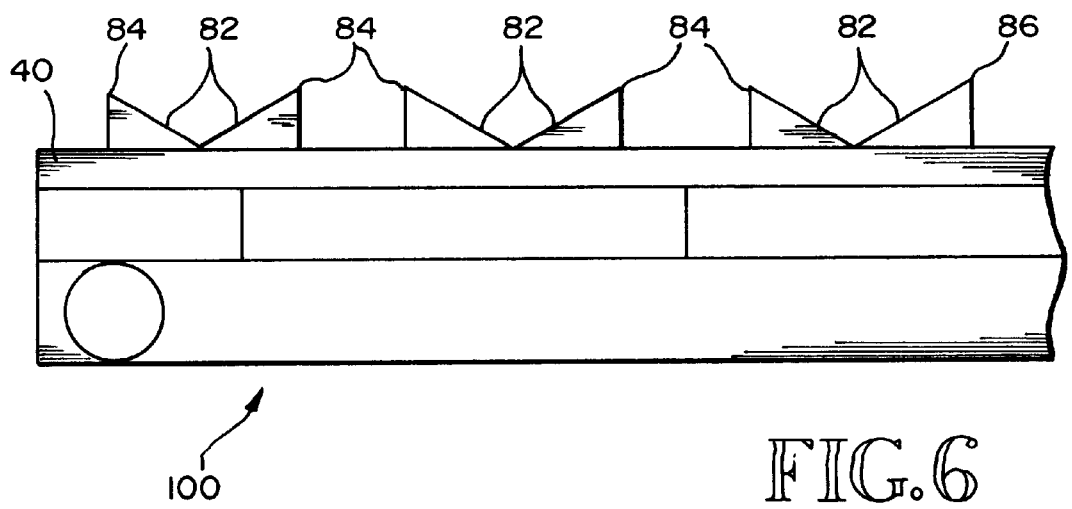
FIG. 6 is a partial side elevation view of the sloughing wall of FIG. 2.

FIG. 6 shows the second embodiment of the sloughing wall 100 of FIG. 2. Sloughing wall 100 includes bulk material engaging teeth 82 that are designed to be mounted in a slat 40, just like slat 40 of FIG. 3. While the teeth 60, 62 of the sloughing wall embodiment of FIG. 4 are triangular in shape, as discussed further with reference to FIG. 12, teeth 82 have a V-shaped notch formed therein that creates a pair of pointed corners 84 for each tooth. An advantage of this design is that when the slats of sloughing wall 100 are reciprocated, pointed corners 84 of teeth 82 present a blunt edge to the bulk material in both the upward and downward directions of slat movement. A blunt edge, as opposed to an angled edge, does a better job of grabbing the bulk material, which is advantageous when handling garbage.

In FIG. 7, a third embodiment of a sloughing wall 200 is shown in plan view. In this embodiment, a plurality of elongated slats 210 are mounted side-by-side across the width of the sloughing wall. In this embodiment, no gaps are formed between slats 210. This feature is similar to the design of the embodiment of FIG. 1. In operation, no bulk material will pass between the slats, as will happen with the sloughing wall of FIG. 2. Rather, the bulk material will pass downwardly in front of slats 210, similar to that shown in FIG. 1.

A section of slats 210 are shown cut away at 212, to illustrate a hydraulic drive unit 214. Drive unit 214 is discussed in more detail with reference to FIG. 10. A set of three transverse drive beams 216, 218, 220 are secured to drive unit 214 and reciprocated by drive unit 214 back and forth in the direction of arrow 222. Transverse drive beam 218 is longer than transverse drive beams 216, 220 and, as such, extends laterally outwardly toward the side regions of sloughing wall 200. The outward ends of transverse drive 218 are adapted to connect to the outermost slats. All of the other slats, which are between the outer most conveyor slats, are secured alternately to transverse drive beams 220, 216, 218. In this manner, slats 210 are divided into three groups of slats, with each group of slats being secured to one of transverse drive beams 216, 218, 220. As discussed in prior patents referenced herein, transverse drive beams 216, 218, 220 move in unison in a first direction to convey all of the slats in that direction. Each transverse drive beam 216, 218, 220 is then reciprocated backwardly in an opposite direction, one at a time, to return its set of slats to a start position.

As shown in FIGS. 7–9, the framework for sloughing wall 200 includes at least a pair of longitudinal mainframe beams 230, 232 and preferably four such mainframe beams, 230, 232, 234, 236, as shown in FIG. 9. A set of longitudinally spaced cross sills 240 are mounted on mainframe beams 230–236.

In the third embodiment shown in FIG. 7–9, the bulk material engaging teeth 250 are in the form of inverted triangles, with the apex of each triangle secured to the slats 210 and a pair of outwardly projecting corner points 252 exposed for engaging bulk material. With the design of FOGS. 7–9, an array of teeth 250 are arranged on sloughing wall 200 so that the surface of sloughing wall 200 is substantially covered with bulk material engaging teeth. No gaps are formed between conveyor slats 210. In this manner, teeth 250 grab bulk material and break it apart in both the up and down directions, causing it to fall downwardly in front of sloughing wall 200 and onto the secondary conveyor. In this manner, bulk material is metered onto the secondary conveyor. The design of teeth 250 is particularly for handling garbage.

FIG. 10 illustrates the drive unit 214 associated with sloughing wall 200 of FIG. 7. Drive unit 214 includes three linear hydraulic motors M. Certain aspects of linear hydraulic motors M are discussed in more detail in U.S. Pat. No. 5,562,018, granted Oct. 8, 1996 to Raymond Keith Foster, and in co-pending patent application Ser. No. 08/571,564 entitled "Drive Unit with Bearing Mount", filed Dec. 13, 1995, by Raymond Keith Foster. Linear hydraulic motors M are piston cylinder motors having fixed piston components and a movable cylinder component. However, fixed cylinder components and movable piston components would also work. An axially extending tubular extension 260 is secured to each cylinder component of motors M. Tubular extensions 260 are guided by side bearings 262, which are secured to a first transverse mounting beam 264. The arrangement of tubular extensions 260, slide bearings 262, and transverse mounting beam 264 are discussed in more detail in co-pending U.S. Pat. No. 08/571,564.

The other ends of linear hydraulic motors M are secured in ball blocks 266, 268. Ball blocks 266, 268 are secured to a second transverse mounting assembly 270. Assembly 270 is discussed in more detail in the prior referenced U.S. Pat. No. 5,562,018. First an second transverse mounting members 264, 270 are connected together by a pair of laterally spaced, longitudinally extending beams 274. Beans 274, and transverse mounting members 264, 270 form a sub-framework for supporting linear hydraulic motors M. The center transverse drive beam 218 is secured to the center linear hydraulic motor M, while transverse drive beam 220 is secured to the far left linear hydraulic motor M and transverse drive beam 216 is secured to the far right linear hydraulic motor M.

FIGS. 11–13 illustrate sloughing wall 10 of FIG. 1. The slats 40 of sloughing wall 10 are spaced apart laterally to form longitudinal gaps 90 between the slats. Gaps 90 provide openings for bulk material to fall through as the bulk material is combed by teeth 60, 62. Drive unit 92 is similar to drive unit 214 of FIG. 10, except that only a single transverse drive beam 94 is provided. A single linear hydraulic motor M is mounted on a sub-framework similar to that shown in FIG. 10. Transverse drive beam 94 is connected by a set of shoes 96 to each of slats 40. Sloughing wall 10 includes a set of longitudinal mainframe beams 97 and a set of longitudinally spaced cross sills 98. For clarity, only teeth 60 are shown in FIG. 12. As can be seen, teeth 60 are in the form of triangles with a base of each triangle secured to a slat 40 and the apexes 99 of the triangles pointing outwardly to engage and grab bulk material.

In the embodiment shown by FIGS. 11–13, it may be preferably to encase the back side of drive unit 92 in sheet metal, in order to prevent bulk material from damaging the drive unit. The front side of drive unit 92 necessarily is exposed to slats 40.

FIGS. 14–16 show an embodiment of a sloughing wall 300 that is similar to sloughing wall 10 of FIGS. 11–13.

Sloughing wall 300 includes elongated slats 40 and bulk material engaging teeth 60, 62, like those of sloughing wall 10. In the embodiment of FIG. 14, three transverse drive beams 302, 304, 306 are provided. Transverse drive beam 304 extends the width of sloughing wall 300, while transverse drive beams 302, 306 are approximately half the length of transverse drive beam 304. Transverse drive beam 304 connects to the outermost slats and the center slat, while transverse drive beams 302, 306 alternately connect to the other four conveyor slats. Shoes 308 indicate which slats are connected to which transverse drive beams. The embodiment of FIGS. 14–16 can be utilized for conveying heavier loads than the embodiment of sloughing wall 10 of FIGS. 11–13.

Figure 17:
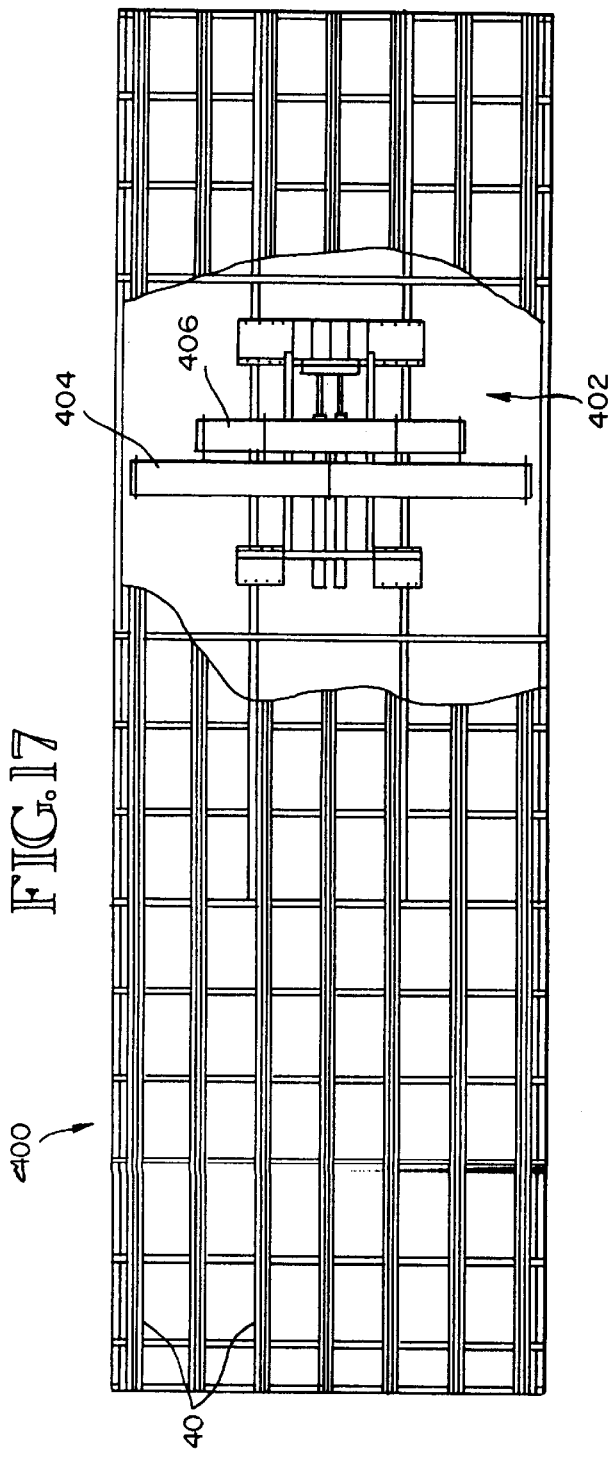
FIG. 17 is a plan view of a fourth embodiment of the sloughing wall of the present invention, shown with a portion cut away to illustrate the drive unit.
Figure 18:
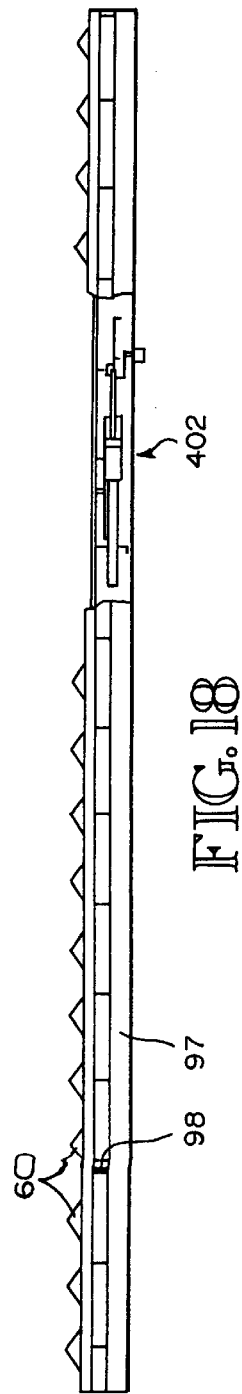
FIG. 18 is an end elevation view of the sloughing wall of FIG. 17, shown with a portion cut away to illustrate the drive unit.
Figure 19:
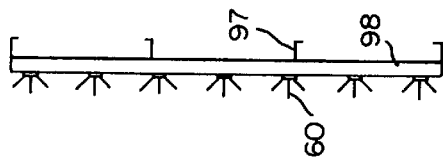
FIG. 19 is an end elevation view of the sloughing wall of FIG. 17.

FIGS. 17–19 illustrate an embodiment of a sloughing wall 400 similar to sloughing wall 300 of FIGS. 14–16 and sloughing wall 10 of FIGS. 11–13. Sloughing wall 400 is similar to sloughing wall 300, except that transverse drive beam 302 of sloughing wall 300 has been eliminated so that only transverse drive beams 404 and 406 are utilized. In this embodiment, only two linear hydraulic motors, one for each transverse drive beam 404, 406, are provided with drive unit 402.

The basic idea of the present invention, as illustrated in the various embodiments, is to provide an array of teeth capable of grabbing the forward edge portions of bulk material in a combing fashion. The reciprocating action of the teeth against the bulk material breaks apart the bulk material, allowing it to fall downwardly onto the secondary conveyor. This reciprocating teeth action functions to meter the bulk material onto the secondary conveyor and also functions to break apart any bulk material that has set or bound together so that the bulk material can be conveyed in a controlled manner.

The illustrated embodiments are only examples of the present invention and, therefore, are non-limitive. It to be understood than many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A bulk material handling system, comprising:
    a container for receiving bulk material, said container including a floor, a pair of sidewalls, and an outlet end;
    said floor comprising a first conveyor for conveying bulk material through the container to and out said outlet end;
    said first conveyor having a discharge end that is generally at the outlet end of the container;
    a bulk material break-up device comprising a generally vertical, generally transverse frame at the outlet end of the container, in the path of the bulk material, a plurality of elements mounted on said frame for generally up and down reciprocation, and bulk material contacting teeth on said elements facing towards the bulk material on the first conveyor;
    said material break-up device being operable for loosening bulk material as the bulk material is being moved by said first conveyor against the break-up teeth;
    a secondary conveyor positioned generally below the outlet end of the container; and
    wherein bulk material loosened by the bulk material break-up device falls onto the secondary conveyor through an inlet that is horizontally between the discharge end of the conveyor in the container and the break-up device.

2. A bulk material handling system according to claim 1, wherein said elements are elongated and parallel, and the bulk material contacting teeth are distributed along said elements.

3. A bulk material handling system according to claim 2, wherein the bulk material break-up device includes spaces between the elements through which bulk material may pass.

4. A bulk material handling system according to claim 1, wherein the bulk material break-up device includes spaces between the elements through which bulk material may pass.

5. A bulk material handling system according to claim 1, wherein said frame is pivotally mounted on said container for pivotal movement about a horizontal axis, to allow a lower end of the frame to move away from the discharge end of the conveyor and make the space wider.

6. A bulk material handling system according to claim 5, wherein said frame has an upper end and said axis is at least near said upper end.

7. A bulk material handling system according to claim 1, wherein the conveyor within the container is a reciprocating slat conveyor comprising a plurality of elongated conveyor slats that extend longitudinally of the conveyor.

8. A bulk material handling system, comprising:
    a container for receiving bulk material, said container including a floor, a pair of sidewalls, and an outlet end;
    said floor comprising a conveyor for conveying bulk material through the container to and out said outlet end;
    said conveyor having a discharge end that is generally at the outlet end of the container;
    a bulk material break-up device comprising a generally vertical, generally transverse frame at the outlet end of the container, in the path of the bulk material, a plurality of elements mounted on said frame for generally up and down reciprocating, and bulk material contacting teeth on said elements;
    said material break-up device being operable for loosening bulk material as the bulk material is being moved by said conveyor against the teeth;
    wherein said elements are elongated and parallel, and the bulk material contacting teeth are distributed along said elements; and
    wherein the bulk material break-up device includes spaces between the elements through which bulk material may pass.

9. A bulk material handling system according to claim 8, wherein said frame is pivotally mounted on said container for pivotal movement about a horizontal axis, to allow a lower end of the frame to move away from the discharge end of the conveyor.

10. A bulk material handling system according to claim 9, wherein said frame has an upper end and said axis is at least near said upper end.

11. A bulk material handling system according to claim 8, wherein the conveyor within the container is a reciprocating slat conveyor comprising a plurality of elongated conveyor slats that extend longitudinally of the conveyor.

12. A bulk material handling system, comprising:
    a container for receiving bulk material, said container including a floor, a pair of sidewalls, and an outlet end;

said floor comprising a conveyor for conveying bulk material through the container to and out said outlet end;

said conveyor having a discharge end that is generally at the outlet end of the container;

a bulk material break-up device comprising a generally vertical, generally transverse frame at the outlet end of the container in the path of the bulk material, a plurality of elements mounted on said frame for generally up and down reciprocation, and bulk material contacting teeth on said elements;

said material break-up device being operable for loosening bulk material as the bulk material is being moved by said conveyor against the teeth; and said frame being pivotally mounted for pivotal movement about a horizontal axis, to allow a lower end of the break-up device to move away from the discharge end of the conveyor.

13. A bulk material handling system according to claim 12, wherein said frame has an upper end and said axis is at least near said upper end.

14. A bulk material handling system according to claim 12, wherein a secondary conveyor is positioned below the outlet end of the container, and bulk material loosened by the bulk material break-up device falls onto the secondary conveyor through a space that is horizontally between the discharge end of the conveyor and the break-up device.

15. A bulk material handling system according to claim 12, wherein the conveyor within the container is a reciprocating slat conveyor comprising a plurality of elongated conveyor slats that extend longitudinally of the conveyor.

16. A bulk material handling system according to claim 12, wherein the bulk material break-up device includes spaces between the elements through which bulk material may pass.

* * * * *